(12) United States Patent
Townsend

(10) Patent No.: US 6,874,274 B2
(45) Date of Patent: Apr. 5, 2005

(54) ROCK SIMULATING PEST TRAP

(76) Inventor: Lyle Townsend, 11630 Slater Ave. NE, Ste 5, Kirkland, WA (US) 98034

( * ) Notice: Subject to any disclaimer, the term of this patent is extended or adjusted under 35 U.S.C. 154(b) by 0 days.

(21) Appl. No.: 10/801,143

(22) Filed: Mar. 15, 2004

(65) Prior Publication Data

US 2004/0200133 A1 Oct. 14, 2004

Related U.S. Application Data

(63) Continuation-in-part of application No. 09/929,779, filed on Aug. 14, 2001.
(60) Provisional application No. 60/241,244, filed on Oct. 18, 2000.

(51) Int. Cl.$^7$ ....................... A01M 25/00; A01M 23/24; A01M 1/14
(52) U.S. Cl. ................. 43/131; 43/58; 43/81; 43/107; 43/114
(58) Field of Search ............. 43/131, 58, 81, 43/107, 114, 121, 132.1

(56) References Cited

U.S. PATENT DOCUMENTS

| | | | | |
|---|---|---|---|---|
| RE14,782 E | * | 12/1919 | Hedrich et al. | 43/131 |
| 1,349,177 A | * | 8/1920 | Wiemer | 43/81 |
| 1,511,123 A | * | 10/1924 | Hart | 43/81 |
| 1,573,278 A | * | 2/1926 | Schlesinger | 43/131 |
| 1,770,330 A | * | 7/1930 | Buford | 43/121 |
| 1,960,464 A | * | 5/1934 | Thalheimer | 43/131 |
| 2,060,245 A | * | 11/1936 | Rosefield | 43/131 |
| 2,332,334 A | * | 10/1943 | Morrison | 43/81 |
| 2,664,663 A | * | 1/1954 | Mullen | 43/131 |

(Continued)

FOREIGN PATENT DOCUMENTS

| | | | | |
|---|---|---|---|---|
| AU | 9533181 A1 | * | 4/1996 | |
| CH | 117115 B1 | * | 10/1926 | 43/58 |
| DE | 306248 B1 | * | 6/1918 | 43/131 |
| DE | 2532523 A1 | * | 2/1977 | |
| DE | 2703978 A1 | * | 8/1978 | 43/131 |
| DE | 3905489 A1 | * | 8/1990 | 43/131 |
| DE | 4134678 A1 | * | 10/1992 | 43/131 |
| FR | 1360310 B1 | * | 3/1964 | 43/131 |
| FR | 1418907 B1 | * | 10/1965 | 43/131 |
| FR | 1453866 B1 | * | 8/1966 | 43/131 |
| FR | 2517930 A1 | * | 6/1983 | |
| FR | 2557425 A1 | * | 7/1985 | |
| GB | 7018226 A1 | * | 4/1954 | 43/131 |
| GB | 1402404 A1 | * | 8/1975 | 43/131 |
| GB | 2023987 A1 | * | 1/1980 | |
| GB | 2249249 A1 | * | 5/1992 | 43/131 |
| GB | 2391159 A1 | * | 2/2004 | |
| WO | WO-82/03968 A1 | * | 11/1982 | 43/131 |
| WO | WO-86/01682 A1 | * | 3/1986 | 43/58 |

Primary Examiner—Darren W. Ark
(74) Attorney, Agent, or Firm—Dean A. Craine

(57) ABSTRACT

A tamper-resistant pest trap that has an outer housing that simulates a rock typically found in a garden or landscape area around a residence or building. The outer housing includes a substantially flat bottom member and a pivotally attached upper dome-shaped lid member. When the lid member is closed over the bottom member, a large cavity is formed inside the trap. Formed on the bottom member are two, inward extending tunnel cavities that form two partially concealed tunnels that extend under the trap when the trap is placed on the ground. Formed on the perimeter edge of the outer housing is an outer pest opening. From on the bottom member directly over the tunnel cavity is an inner pest opening that allows a rodent to enter the large cavity after traveling through the tunnel. Formed inside the outer housing is a holding tray designed to hold a rodenocide or a mechanical trap capable of killing the rodent. An optional bait paper tray is also formed in the bottom member to hold bait paper. An optional lock is provided to prevent tampering and stake and hold-down chain are provided to attach the trays to the ground.

16 Claims, 5 Drawing Sheets

U.S. PATENT DOCUMENTS

| | | | | |
|---|---|---|---|---|
| 2,710,485 A | * | 6/1955 | Starr | 43/131 |
| 3,303,600 A | * | 2/1967 | Freeman | 43/131 |
| 3,704,539 A | * | 12/1972 | Alvarez | 43/131 |
| 3,772,820 A | * | 11/1973 | Bond | 43/131 |
| 3,978,607 A | * | 9/1976 | Piere | 43/131 |
| 4,026,064 A | * | 5/1977 | Baker | 43/131 |
| 4,173,093 A | * | 11/1979 | Nakai | 43/121 |
| 4,208,829 A | * | 6/1980 | Manning | 43/131 |
| 4,277,907 A | * | 7/1981 | Ernest | 43/131 |
| 4,349,982 A | * | 9/1982 | Sherman | 43/131 |
| 4,364,194 A | * | 12/1982 | Clark, Sr. | 43/131 |
| 4,400,904 A | * | 8/1983 | Baker | 43/131 |
| 4,400,905 A | * | 8/1983 | Brown | 43/132.1 |
| 4,453,337 A | * | 6/1984 | Williams | 43/131 |
| 4,541,198 A | * | 9/1985 | Sherman | 43/131 |
| 4,619,071 A | * | 10/1986 | Willis | 43/131 |
| 4,637,162 A | * | 1/1987 | Sherman | 43/131 |
| 4,648,201 A | * | 3/1987 | Sherman | 43/131 |
| 4,660,320 A | * | 4/1987 | Baker et al. | 43/131 |
| 4,730,412 A | * | 3/1988 | Sherman | 43/131 |
| 4,825,581 A | * | 5/1989 | Dailey | 43/131 |
| 4,835,902 A | * | 6/1989 | Sherman | 43/131 |
| 5,040,327 A | * | 8/1991 | Stack et al. | 43/131 |
| 5,136,803 A | * | 8/1992 | Sykes et al. | 43/131 |
| 5,272,832 A | * | 12/1993 | Marshall et al. | 43/131 |
| 5,588,250 A | * | 12/1996 | Chiba et al. | 43/114 |
| 5,657,575 A | * | 8/1997 | Miller et al. | 43/131 |
| 5,806,237 A | * | 9/1998 | Nelson et al. | 43/131 |
| 5,915,948 A | * | 6/1999 | Kunze et al. | 43/114 |
| 5,921,018 A | * | 7/1999 | Hirose et al. | 43/131 |
| 5,953,854 A | * | 9/1999 | Hyatt | 43/131 |
| 6,082,042 A | * | 7/2000 | Issitt | 43/131 |
| 6,145,242 A | * | 11/2000 | Simpson | 43/131 |
| 6,164,010 A | * | 12/2000 | Snell et al. | 43/131 |
| 6,202,339 B1 | * | 3/2001 | Knuppel | 43/58 |
| 6,266,917 B1 | * | 7/2001 | Hight | 43/131 |
| 6,370,813 B1 | * | 4/2002 | Nelson et al. | 43/131 |
| 6,374,536 B1 | * | 4/2002 | Washburn | 43/131 |
| 6,389,738 B1 | * | 5/2002 | Denny et al. | 43/58 |
| 6,397,517 B1 | * | 6/2002 | Leyerle et al. | 43/131 |
| 6,493,988 B1 | * | 12/2002 | Johnson | 43/131 |
| 6,651,378 B2 | * | 11/2003 | Baker | 43/131 |
| 6,758,008 B1 | * | 7/2004 | Thebolt | 43/58 |
| 6,789,352 B2 | * | 9/2004 | Price et al. | 43/131 |
| 6,807,768 B2 | * | 10/2004 | Johnson et al. | 43/131 |
| 2003/0115791 A1 | * | 6/2003 | Conroy | 43/131 |

* cited by examiner

ROCK SIMULATING PEST TRAP

This is a continuation-in-part patent application based on the utility patent application (Ser. No. 09/929,779) filed on Aug. 14, 2001 now abandoned and based on the provisional patent application (Ser. No. 60/241,244) filed on Oct. 18, 2000.

BACKGROUND OF THE INVENTION

1. Field of the Invention

This invention pertains to pest traps, and, in particular, to pest traps designed to be used in outdoor, visible areas.

2. Description of the Related Art

Most home and business owners would prefer to place pest traps, when needed, outside their residence or business. Because deadly diseases and filthy conditions are often associated with insects and rodents, the placement of traps inside residences and businesses where they may be in plain view of guests or visitors is undesirable.

In order to use a pest trap outdoors, a protective outer housing is used which houses the poisoned bait or body-piercing trap. Such traps are disclosed in U.S. Pat. Nos. 4,541,198, 4,550,525, 4,611,426, 4,730,412, 5,040,327, 5,448,852, and 6,082,042.

One drawback of such traps is that the outer housings are relatively large structures that are visible at a distance. Because of the negative connotation associated with insect and rodent traps, most homeowners find the visibility of such traps objectionable. Although the traps may be placed behind other objects or covered with dirt to hide them, this is undesirable because it prevents the trapper from easily checking or retrieving the traps.

What is needed is a tamper-resistant, inconspicuous, outdoor pest trap that is effectively disguised as a large object typically found in a garden, such as a rock.

SUMMARY OF THE INVENTION

It is an object of the present invention to provide a pest trap designed for outdoor use.

It is another object of the present invention to provide such a pest trap that is tamper-resistant by isolating the poisoned bait or animal trap inside an outer housing to prevent unintentional targets, such as children, pets, and other small animals, from contacting the bait or trap.

It is a further object of the present invention to provide a pest trap that is disguised as a large rock, so that it may be placed anywhere in a yard or garden so that customers or neighbors are not privy to the fact that a pest problem may exist.

These and other objects of the invention, which will become apparent are met by a tamper-resistant pest trap that has an outer housing that simulates a rock typically found in the garden or a landscape area around a residence or building. The outer housing is a hollow structure with a large cavity formed therein. Located inside the cavity is a holding tray designed to hold a rodentcide or a mechanical trap capable of killing a rodent. Formed on the bottom member of the outer housing are two tunnel cavities that forms two partially concealed tunnels that extend under the outer housing when the outer housing is placed in an upright position on the ground.

In the preferred embodiment, the bottom member is substantial flat designed to rest on a flat ground surface. Attached to the bottom member is a dome-shaped lid member. The two tunnel cavities, which are formed on opposites of the center axis of the bottom member, are concave in cross-section and curve rearward and centrally. The perimeter edge of the bottom member adjacent to each tunnel cavity is concaved upward and irregular and designed to slightly overhang the tunnel cavity thereby partially concealing the tunnel from view when the trap is placed on the ground.

In the preferred embodiment, the rear edge of the lid member is pivotally attached to the rear edge of the bottom member. The mating perimeter edges of the bottom member and lid member are beveled and so that perimeter edges lid member and bottom member mate thereby allowing them to close evenly with a small gap between them.

An optional stake and hold-down chain is provided which are used to securely hold the outer housing on the ground to prevent its movement. An optional key lock is also provided that prevents the lid member from being opened.

DESCRIPTION OF THE PREFERRED EMBODIMENT(S)

Figure 1:
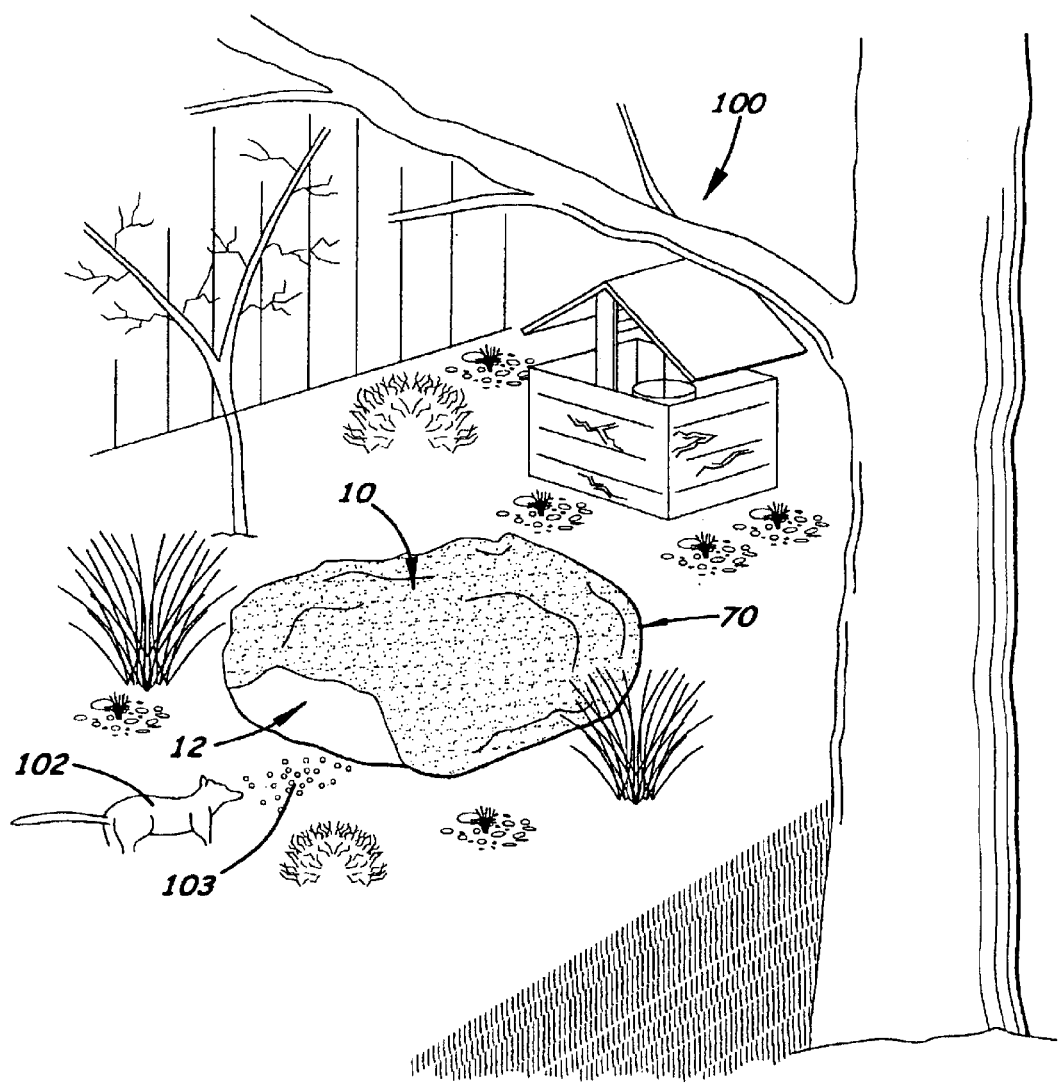
FIG. 1 is a perspective view of the pest trap disclosed herein, simulating a natural rock located in a landscape area.
Figure 2:
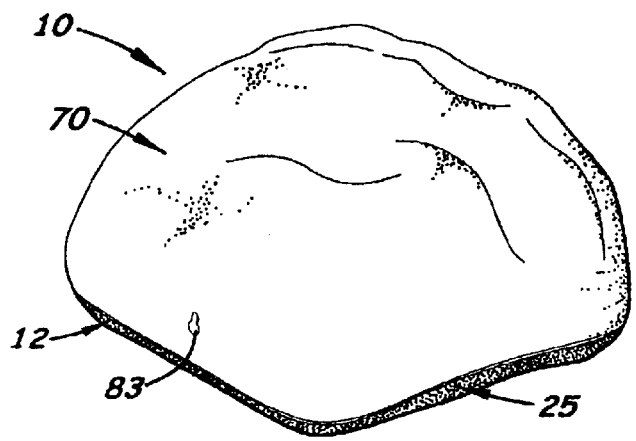
FIG. 2 is a right side perspective view of the invention.
Figure 3:
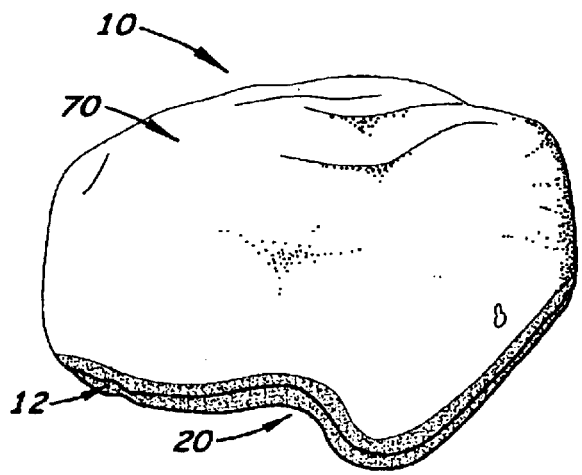
FIG. 3 is a left side perspective view of the invention.
Figure 4:
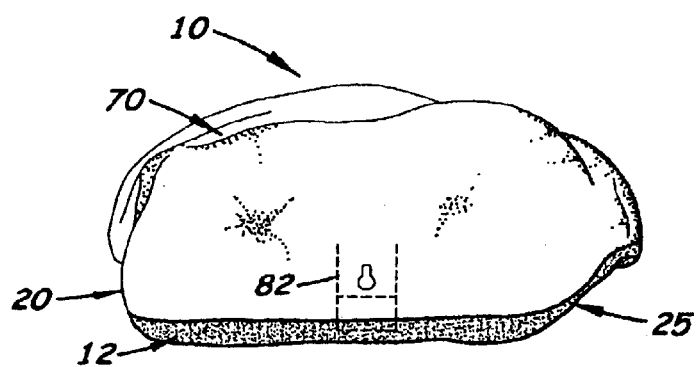
FIG. 4 is a front elevational view of the invention.
Figure 5:
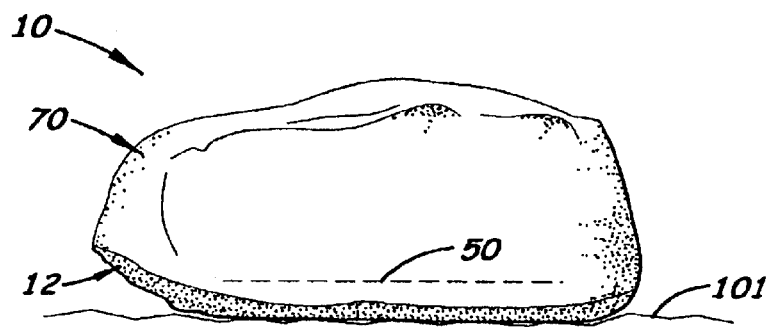
FIG. 5 is a rear elevational view of the invention.
Figure 6:
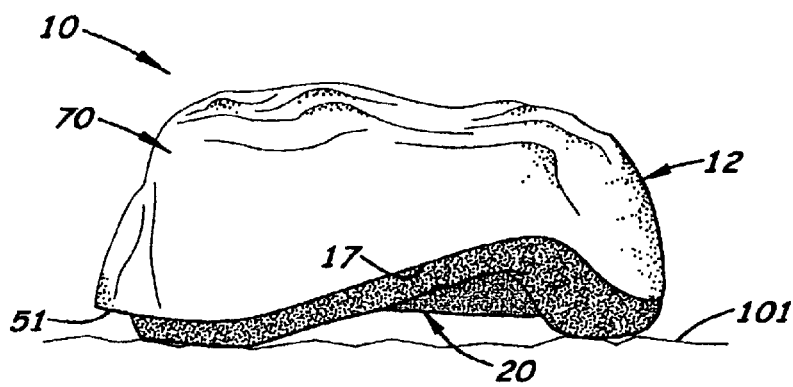
FIG. 6 is a left side elevational view of the invention.
Figure 7:
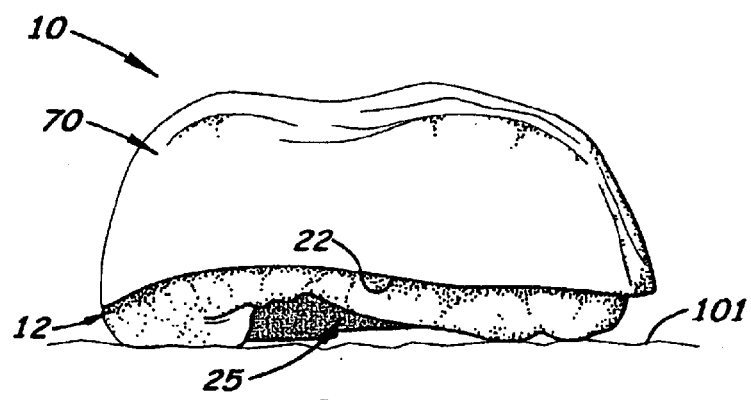
FIG. 7 is a right side elevational view of the invention.
Figure 8:
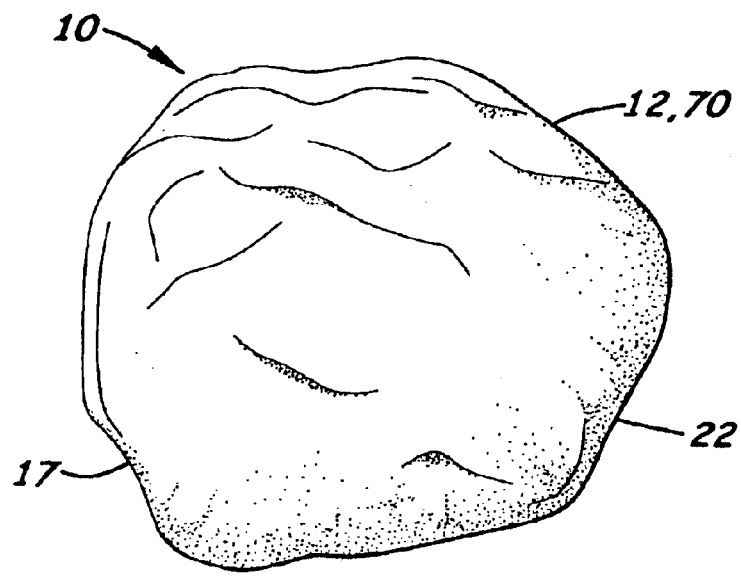
FIG. 8 is a top plan view of the invention.
Figure 9:
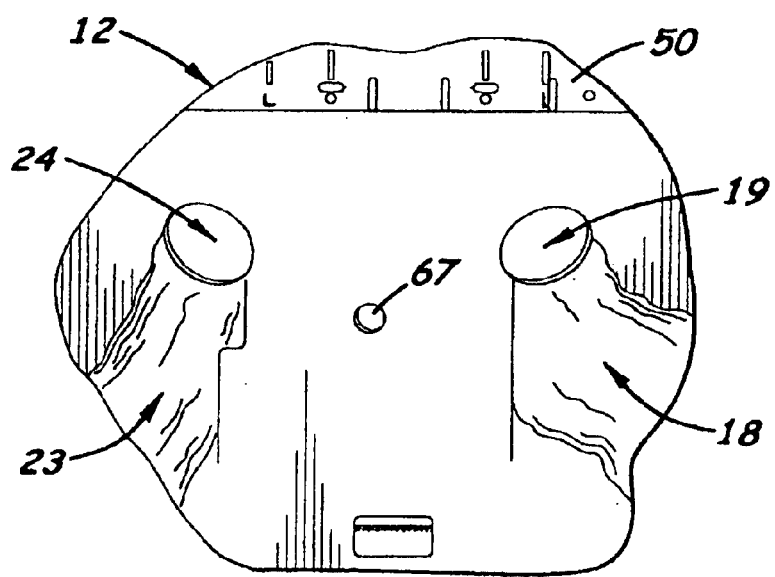
FIG. 9 is a bottom plan view of the invention.

Referring to FIG. 1–11, there is, shown and described a pest trap 10 designed to simulate a rock in a garden or landscape area 100. The pest trap 10 includes a substantially flat bottom member 12 and a dome-shaped upper lid member 70. The bottom member 12 and lid member 70 are complimentary in shape so that when the lid member 12 is aligned and registered over the bottom member 70, a simulating three-dimensional rock-shaped structure.

Formed on opposite sides of the bottom member 12 are two, inward extending tunnel cavities 18, 23. Each tunnel cavity 18, 23 are concave in cross-section and curves slightly rearward and centrally on the bottom member 12. When the trap 10 is plated on the ground 101, the tunnel cavities 18, 23 form two tunnels 20, 25 on opposite sides of the outer housing 11 that leads into a large cavity 65 formed inside the structure. The sections of the perimeter edge denoted 12A, 12B, respectively of the bottom member 12 adjacent to the two tunnel cavities 18, 23 are irregular and concave thereby forming two outside pest opening 17, 22 into the adjacent tunnel cavities 18, 23, respectively.

Formed centrally on the bottom member 12 and over the adjacent tunnel cavity 18 or 23 is a substantially circular large inside pest opening 19 or 24, respectfully. When the pest trap 10 is placed on the ground, a rodent 102 passes through one of the tunnels 20 or 25 and through the inside pest opening 19 or 24, respectively, to enter the large cavity 65. In the preferred embodiment, the two inside pest openings 19, 24 are located on opposites sides of the center axis of the bottom member 12 so that a rodent 102 when passing through one inside pest opening 19 or 24 has an unobstructive view of the opposite inside pest opening 19 or 24. The inventor postulates that rodents 102 are more likely to enter the large cavity 65 if an alternative escape route such as the opposite inside pest opening is viewable by the rodent 102.

Figure 10:
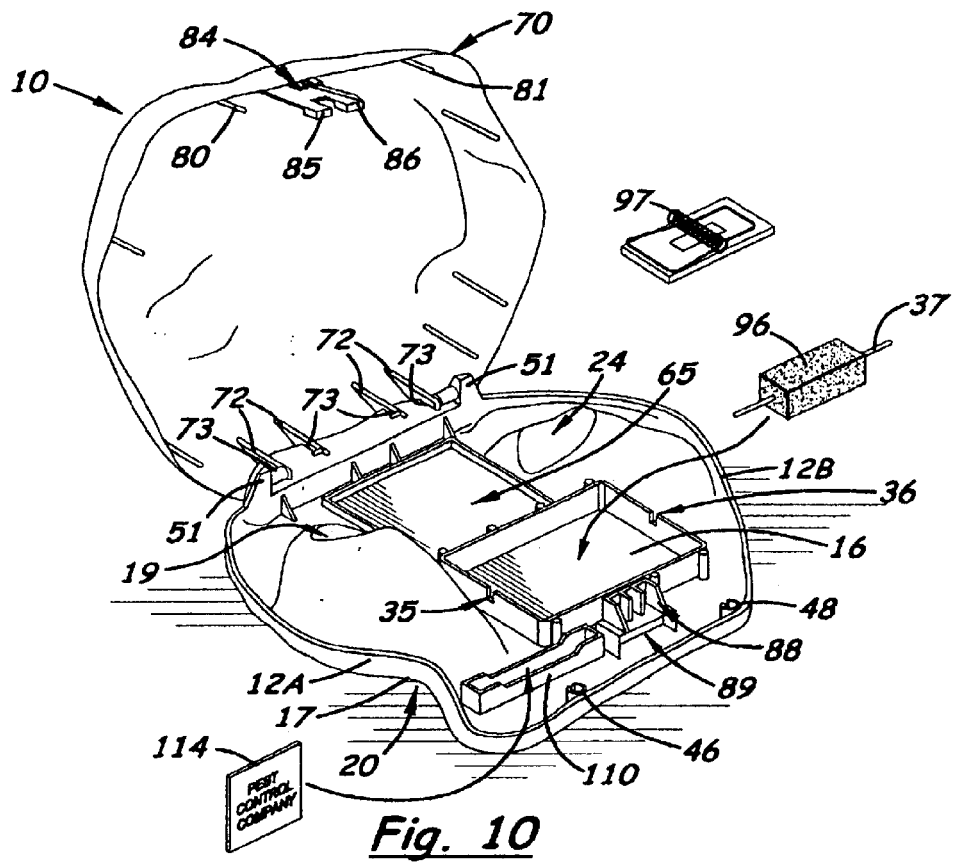
FIG. 10 is a perspective view of the invention showing the lid member in an open position over the bottom member.
Figure 11:
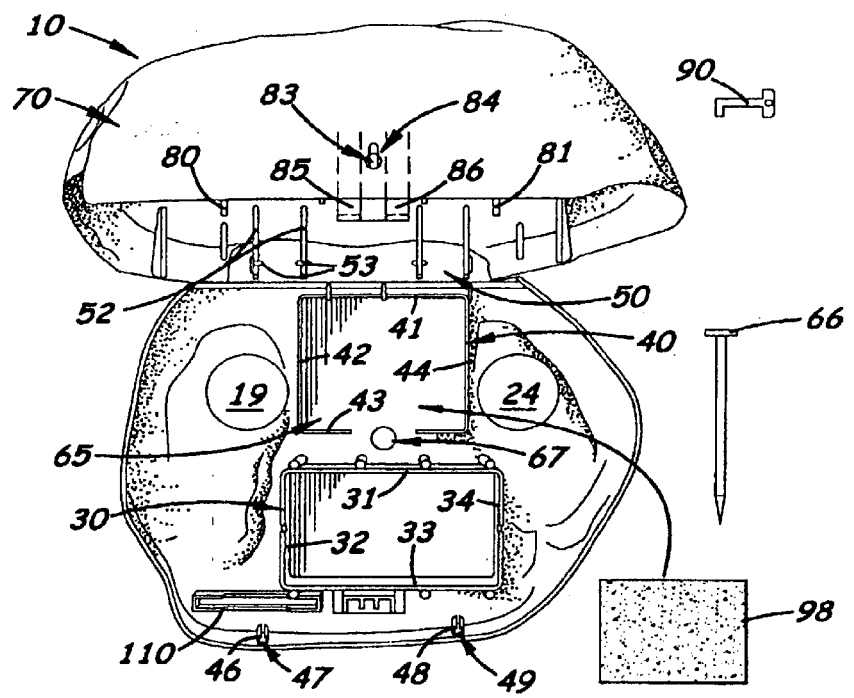
FIG. 11 is a top plan view of the invention showing in FIG. 10.

As shown more clearly in FIGS. 10 and 11, formed centrally on the top surface 16 of the bottom member 12 is a holding tray 30 designed to hold a rodenticide bait 96 or a mechanical trap 97 capable of killing a rodent 102. In the preferred embodiment, the holding tray 30 is centrally aligned on the top surface 16 between the two inside pest openings 19, 24. The holding tray 30 is rectangular and includes four sidewalls 32–34 with two vertically aligned slots 35, 36 formed on two opposite sidewalls 32, 34. During assembly, a rod 37 attached to bait 96 is placed between the two slots 35, 36 to hold bait 96 inside the holding tray 30.

Also formed behind the holding tray 30 is a bait paper tray 40 designed to hold bait paper 98 commonly used against insects and slugs. The bait paper tray 40 is square or rectangular with four short sidewalls 41–44 designed to hold one or two sheets of replaceable bait paper 98.

In the preferred embodiment, the lid member 70 is pivotally attached along one edge to the bottom member 12. As shown in FIGS. 5 and 9–11, the bottom member 12 includes an elevated, rearward extending, horizontal hinge plate 50 formed adjacent to the bottom member's rear edge. Formed on the hinge plate 50 are four parallel slots 52. Each slot 52 extends rearward and includes a transversely aligned axle 53. Located on the opposite ends of the hinge plate 50 are two vertically aligned guide plates 51 used to align the lid member 70 on the bottom member 12 when the lid member 70 is closed over the bottom member 12. Formed on the lid member 70 adjacent to the rear wall of the lid member 70 are four arms 72. The arms 72 are aligned and registered with the four slots 52 formed on the hinge plate 50. Each arm 72 includes a receiving slot 73 designed to receive the axle 53 on an adjacent slot 52 formed on the hinge plate 50 to pivotally attach the lid member 70 to the bottom member 12.

In the preferred embodiment the bottom member 12 and lid member 70 are made of ⅛ inch cross-linked polyurethane and is gray in color with black flakes to simulate a "one" to "three man" size granite rock. When the lid member 70 is closed on the bottom member 12, the pest trap 10 measures approximately 15 inches in length, 11 inches in width, and 6 inches in height, and weighs approximately 2 lbs. In the preferred embodiment, the two tunnel cavities 18, 23 are approximately 2½ inches in width and 2 inches in height and 3 to 6 inches in length. The outer pest openings 17, 22 to the two tunnel cavities 18, 23, respectfully, are concave and ragged and measure approximately 7 inches in length and 2 inches in height at the apex. Each tunnel cavity 18, 23 are approximately 8 inches in length, 4 inches in width and 3 inches in height. The inside pest openings 18, 24 are approximately 3 inches in diameter.

The pest trap 10 may be held in place on the ground 40 by an optional stake 66 that extends through a hole 67 located centrally on the bottom member 12 to hold the pest trap 10 to the ground 40. In the preferred embodiment, the stake 66 is a round rod approximately 14 inch in diameter and 10–16 inches in length which maybe easily driven into the ground.

Formed near the front edge of the bottom member 12 are two hollow posts 46, 48 designed to receive two vertically aligned pegs 80, 81 located near the front edge of the lid member 70. The posts 46, 48 and pegs 80, 81 are aligned and registered so that the pegs 80, 81 extend into the opening 47, 49 formed in the posts 46, 48, respectfully, the lid member 70 is closed over the bottom member 12.

Disposal between the bottom member 12 and the lid member 70 is an optional key locking mechanism 82. In the preferred embodiment, shown more clearly in FIGS. 10 and 11 the locking mechanism 82 includes a rearward biased latch 84 vertically aligned and attached to the lid member 70. A clasp 88 is attached to the bottom member 12. The clasp 88 includes a receiving space 89 designed to receive two rearward aligned teeth members 85, 86 formed on the inside surface of the latch 84. An optional key 90 is provided that extends through a keyhole 83 formed on the front surface of the lid member 70. During use, the pest control operator inserts the complimentary shaped key 90 into the keyhole 83 and engages the latch 84 to pull the latch 84 forward to disengage the teeth members 85, 86 latch 84 from the receiving spaced 89 formed on clasp 88. Formed inside the bottom member 12 is an optional recording sheet holder 110. The holder 110 includes a slot 112 designed to receive a report card 114 to be filled out by the pest trap operator.

During use, the pest trap 10 is set up on a flat section of ground 40. The bait 96 or trap 97 is placed in the holding tray 30. Alternatively, the bait paper 98 maybe placed inside the bait tray 40. Rodents 102 or insects 103 are attracted to the smell of the bait 96 or paper 98 located in the holding trays 30 or 40. The rodent 102 or insects 103 pass through one of the two outer pest openings 17, 22 to enter the tunnel 20 or 25. The rodent 102 or insects 103 then work through the tunnel 20 or 25 and into the large cavity 65 through one of the inside pest openings 17 or 24. Once the rodent 102 enters the large cavity 65 it has access to the bait 96 or to the tray 97 located in the holding tray 30. The insects have access to the bait paper 98. The rodent 102 eats the bait 96 or activates the trap 97 while the insects 103 adhere to the bait paper 98. The operator of the pest trap 10 then opens the trap to gain access to the large cavity 60 to remove the dead rodent 102 or insects 103 from the trap 10, then adds more bait 96, re-set's the trap 97 or replaces the bait paper 98. The operator then selects the report card 114 and records the activities. The report card 114 is then replaced back into the holder 110. The lid member 70 is then closed and locked on the bottom member 12.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A pest trap, comprising:
   a. a substantially flat bottom member with two tunnel cavities formed thereon, each said tunnel cavity being concave in cross section, and extending centrally on said bottom member thereby forming two tunnels under said bottom member when said bottom member is placed on a flat ground surface, each said tunnel being defined by one of said tunnel cavities on said bottom member and the ground surface, said bottom member also including a section of an outer perimeter edge that is concave upward and irregular thereby forming an outer pest opening into each said tunnel cavity, said bottom member also including an inside pest opening located over each said tunnel cavity;

b. a dome-shaped upper lid member pivotally attached to said bottom member, said lid member having an outer surface that simulates a rock and forms an enclosed large cavity when attached and closed over said bottom member; and, c. a means for terminating a pest located inside said cavity.

2. The pest trap as recited in claim 1, further including a hinge disposed between said bottom member and lid member thereby pivotally attaching said lid member to said bottom member, wherein said hinge includes a hinge plate formed on said bottom member with a plurality of axles formed thereon and a plurality of arms formed on said lid member, said arms being aligned on said lid member so that said arms engage said axles on said hinge plate to pivotally attach said lid member to said bottom member.

3. The pest trap as recited in claim 1, further including means for attaching said pest trap to the ground.

4. The pest trap as recited in claim 3, wherein said means for attaching said pest trap to the ground is a hole formed on said bottom member and a stake capable of being inserted into said hole and driven into the ground to hold said pest trap to the ground.

5. The pest trap as recited in claim 1, wherein said means for terminating a pest is a chemical rodenticide.

6. The pest trap as recited in claim 5, further including a holding tray formed on said bottom member capable of holding said pest terminating means, said holding tray being located centrally on said bottom member and between said inside pest openings.

7. The pest trap as recited in claim 1, wherein said means for terminating a pest is a spring activated trap.

8. The pest trap as recited in claim 7, further including a holding tray formed on said bottom member capable of holding said pest terminating means, said holding tray being located centrally on said bottom member and between said inside pest openings.

9. The pest trap as recited in claim 1 wherein said means for terminating a pest is at least one sheet of bait paper capable of terminating insects or slugs.

10. The pest trap as recited in claim 9, further including a bait paper tray located on said bottom member and designed to hold said bait paper.

11. The pest trap as recited in claim 1, further including a lock mechanism disposed between said bottom member and said lid member to lock said lid member in a closed to position said bottom member.

12. The pest trap as recited in claim 11, wherein said lock mechanism includes a biased latch located inside said lid member, a key hole formed on the lid member and adjacent to said latch, a key capable of being inserted into said key hole and pressed against said latch, a clasp located on said bottom member and aligned and registered with said latch when said lid member is placed in a closed position over said bottom member, said clasp including a recessed surface capable of being automatically engaged by said latch when said lid member is placed in a closed position over said bottom member and disengaged when said key is inserted into said hole and forces said latch inward thereby allowing said lid member to pivot an open.

13. A pest trap, comprising:

a. a substantially flat bottom member with two tunnel cavities, each said tunnel cavity being concave in cross section and extending centrally on said bottom member to form a tunnel extending under said bottom member when said bottom member is placed on a flat ground surface, each said tunnel being defined by said tunnel cavity on said bottom member and the ground surface, said bottom member including an outer pest opening formed along a perimeter edge and adjacent to each said tunnel cavity, said bottom member also including an inside pest opening located over each said tunnel cavity, said inside pest openings being aligned on said bottom member so that when a pest passes through one said inside pest opening the view of the other inside pest opening is unobstructed thereby providing an alternative escape for the pest;

b. a dome-shaped upper lid member pivotally attached to said bottom member, said lid member having an outer surface that simulates a rock and forms an enclosed large cavity when attached to said bottom member; and, c. a holding tray used to hold a means for terminating a pest; and, d. a lock mechanism disposed between said lid member and said bottom member, located inside said cavity.

14. The pest trap as recited in claim 13, further including a means for holding said pest trap member on the ground.

15. The pest trap as recited in claim 14, further including a bait paper tray located on said bottom member and designed to hold at least one sheet of bait paper.

16. The pest trap as recited in claim 13, further including a holder for holding a report card inside said large cavity.

* * * * *